US012624254B2

(12) United States Patent
Imahori et al.

(10) Patent No.: US 12,624,254 B2
(45) Date of Patent: May 12, 2026

(54) MULTILAYER SHEET AND PRODUCTION METHOD THEREOF

(71) Applicant: TOAGOSEI CO., LTD., Tokyo (JP)

(72) Inventors: Makoto Imahori, Nagoya (JP); Kentaro Miyamura, Nagoya (JP); Keigo Iwatsuki, Nagoya (JP); Takashi Tsuda, Nagoya (JP)

(73) Assignee: TOAGOSEI CO., LTD., Tokyo (JP)

( * ) Notice: Subject to any disclaimer, the term of this patent is extended or adjusted under 35 U.S.C. 154(b) by 267 days.

(21) Appl. No.: 18/557,484

(22) PCT Filed: Apr. 27, 2022

(86) PCT No.: PCT/JP2022/019093
§ 371 (c)(1),
(2) Date: Oct. 26, 2023

(87) PCT Pub. No.: WO2022/230938
PCT Pub. Date: Nov. 3, 2022

(65) Prior Publication Data
US 2024/0218210 A1     Jul. 4, 2024

(30) Foreign Application Priority Data
Apr. 28, 2021     (JP) ................................ 2021-075960

(51) Int. Cl.
C09J 7/25          (2018.01)
C09J 7/24          (2018.01)
(Continued)

(52) U.S. Cl.
CPC . C09J 7/25 (2018.01); C09J 7/24 (2018.01); C09J 7/30 (2018.01); C09J 123/26 (2013.01);
(Continued)

(58) Field of Classification Search
CPC ..... B32B 27/285; B32B 27/302; C08L 25/00; C08L 25/02; C08L 25/04; C08L 25/06; C08L 25/08; C08L 25/16; C08L 71/00; C08L 71/10; C08L 71/12; C08L 71/123; C08L 71/126; C09J 7/24; C09J 123/26
See application file for complete search history.

(56) References Cited

U.S. PATENT DOCUMENTS

| | | |
|---|---|---|
| 2011/0223703 A1 | 9/2011 | Doi et al. |
| 2017/0223843 A1 | 8/2017 | Kawakami et al. |

(Continued)

FOREIGN PATENT DOCUMENTS

| | | |
|---|---|---|
| JP | 2013060521 A | 4/2013 |
| JP | 2017109613 A | 6/2017 |
| WO | WO 2011/013389 A | 2/2011 |

OTHER PUBLICATIONS

Extended European Search Report for corresponding Application No. EP22795851, dated Feb. 27, 2025, 8 pages.
PCT/JP2022/019093, dated Apr. 27, 2022, 5 pages.

*Primary Examiner* — Zachary M Davis
(74) *Attorney, Agent, or Firm* — Dority & Manning, PA

(57) ABSTRACT
A multilayer sheet includes: a substrate layer (A) that includes 40 to 99.9% by mass of a polyphenylene ether (a1), 0 to 59.9% by mass of a polystyrene (a2), and an amino group-containing polymer (a3); and an adhesive layer (B) that includes an acid-modified polyolefin.

17 Claims, 1 Drawing Sheet

(51) Int. Cl.
C09J 7/30 (2018.01)
C09J 123/26 (2006.01)
(52) U.S. Cl.
CPC ...... *C09J 2301/122* (2020.08); *C09J 2423/00* (2013.01); *C09J 2425/006* (2013.01); *C09J 2471/006* (2013.01)

(56) References Cited

U.S. PATENT DOCUMENTS

2018/0370286 A1 12/2018 Nakakita et al.
2019/0345329 A1* 11/2019 Zhou ...................... H10F 19/85

* cited by examiner

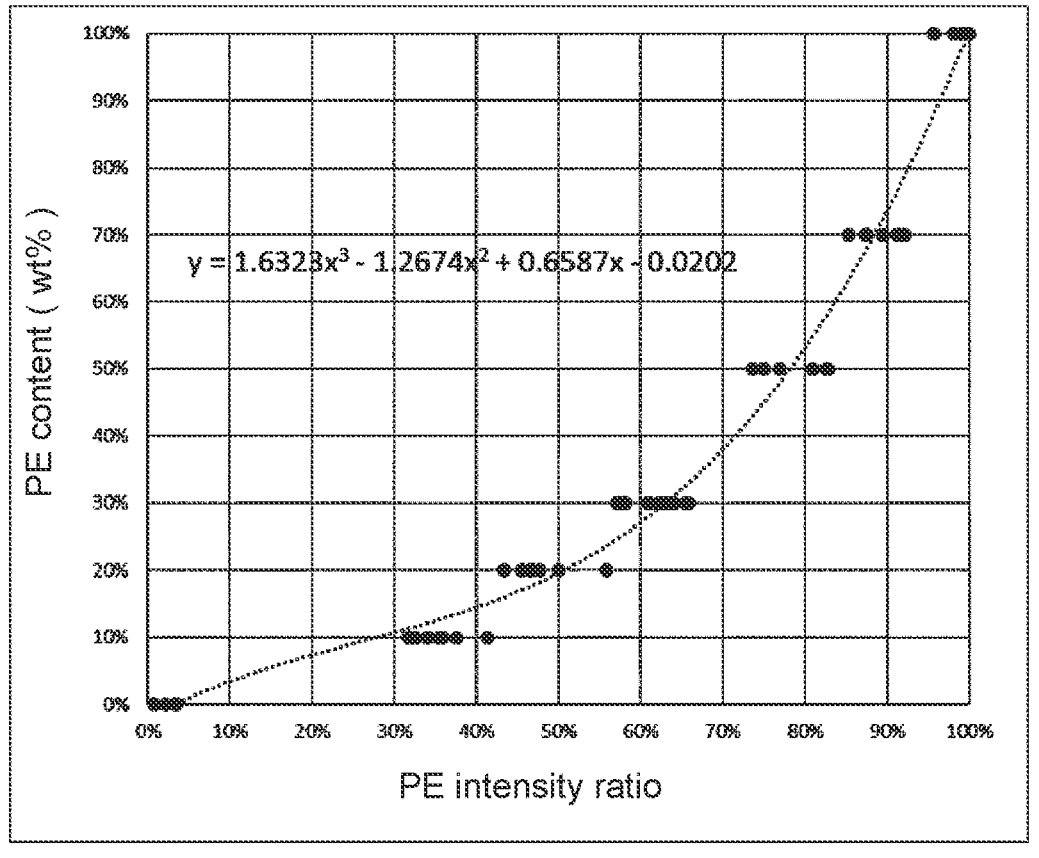

MULTILAYER SHEET AND PRODUCTION METHOD THEREOF

CROSS-REFERENCE TO RELATED APPLICATIONS

The present application is a US national phase entry of International Patent Application No. PCT/JP2022/019093, filed Apr. 27, 2022, and claims priority to Japanese Patent Application No. JP 2021-075960, filed Apr. 28, 2021, both of which are incorporated by reference herein in their entirety for all purposes.

TECHNICAL FIELD

The present invention relates to a multilayer sheet excellent in adhesiveness and heat resistance, which can be used for bonding and sealing various parts and which itself can be used as a sheet-shaped member, and a production method thereof.

BACKGROUND ART

In recent years, hot-melt adhesive compositions have come to be used as adhesive films or sheets (hereinafter, collectively referred to as "adhesive members") for chemical batteries such as lithium-ion batteries and fuel cells incorporated in notebook computers, smartphones, tablets, and automobiles, as well as physical batteries such as solar cells and capacitors. In order to bond metal substrates such as iron, aluminum, titanium, other metals, and alloys thereof, which are used as substrates for constituent members of these batteries, it is known that relatively good adhesion strength can be obtained by using a hot-melt adhesive composition containing an acid-modified olefin-based thermoplastic resin (hereinafter, also referred to as "acid-modified polyolefin") as a main component.

For battery applications, hot-melt adhesive compositions are required to have durability to battery constituent materials in addition to adhesion strength. In lithium-ion batteries, lithium hexafluorophosphate used as an electrolyte may react with moisture to generate hydrofluoric acid, and in fuel cells, acids such as hydrofluoric acid may be generated from an electrolyte membrane, which is a constituent member of the battery, and acid resistance is required. Furthermore, lithium-ion batteries require durability against ethylene carbonate, diethyl carbonate, or the like used as a solvent for the electrolyte, and nickel-hydrogen batteries require durability against strong alkaline aqueous solutions. Further, in fuel cells, a cooling liquid containing ethylene glycol, propylene glycol, or the like is circulated inside the cell for the purpose of cooling the cell that has generated heat due to power generation, so durability against ethylene glycol or the like is also required.

Patent Document 1 discloses a resin composition composed of 50 to 99% by mass of a low-viscosity propylene-based polymer that satisfies specific properties and 1 to 50% by mass of an acid-modified propylene-based elastomer that satisfies specific properties, as well as a hot-melt adhesive including the resin composition. It has excellent adhesiveness to polyolefin-based substrates and also has excellent adhesion strength to metal substrates. Patent Document 2 describes an acid-modified polypropylene as an adhesive between metal and nylon resin.

By layering an acid-modified polyolefin-based adhesive film or sheet on a substrate layer to form a multilayer sheet, it is also possible to obtain an adhesive member with even higher performance and functionality. An engineering plastic having excellent rigidity and heat resistance is used for the substrate layer of this multilayer sheet. By configuring the acid-modified polyolefin-based adhesive into such a multilayer sheet, strength, rigidity, gas barrier properties, chemical resistance, acid/alkali resistance, heat resistance, etc. are improved, and it can be suitably used for applications that require these durability, such as the aforementioned lithium-ion batteries and fuel cells. In addition, by using the multilayer sheet as an adhesive member for lithium-ion batteries and fuel cells, it is possible to reduce the number of constituent members and parts, thereby reducing costs and improving productivity.

As engineering plastics used as substrates for multilayer sheets, polyethylene naphthalate, heat-resistant polyolefins such as cycloolefin polymers, polyphenylene ether-based alloys, and aromatic polyamide resins have been used in terms of heat resistance, rigidity, dimensional stability, and cost. For example, Patent Document 3 describes a layered sheet for sealing an electronic device, in which a first sheet and a second sheet are layered, the first sheet includes an acid-modified polyolefin thermoplastic resin, the second sheet has a higher melting point than that of the first sheet, and the peel strength of the second sheet to the first sheet at 25° C. is from 0.5 to 10.0 [N/15 mm]. Patent Document 3 describes polyethylene naphthalate as a specific example of the second sheet.

PRIOR ART DOCUMENT

Patent Document

Patent Document 1: Japanese Patent Application Laid-Open (JP-A) No. 2013-060521
Patent Document 2: Japanese Patent Application Laid-Open (JP-A) No. 2017-109613
Patent Document 3: International Publication No. 2011/013389

SUMMARY OF INVENTION

Technical Problem

As described above, a multilayer sheet is used as an adhesive member, in which an adhesive layer that includes an acid-modified polyolefin and a substrate layer that includes an engineering plastic such as polyethylene naphthalate, heat-resistant polyolefin such as cycloolefin polymer, polyphenylene ether, and aromatic polyamide resin are layered. However, polyethylene naphthalate and aromatic polyamide resins hydrolyze when used for a long period of time, and have a problem of durability in an environment where they come into contact with moisture. Cycloolefin polymers have a problem that the compression bonding temperature is restricted because the softening point is not sufficiently high. In addition, since cycloolefin polymers have low toughness, problems such as cracking tend to occur during long-term use.

Polyphenylene ethers do not have many problems with deterioration during long-term use, which are seen in other engineering plastics. However, polyphenylene ethers have a problem that they do not adhere to acid-modified polyolefins used for the adhesive layer, and are easily delaminated.

The problem to be solved by the present invention is to provide a multilayer sheet including an adhesive layer that includes an acid-modified polyolefin and a substrate layer that includes a polyphenylene ether, and having high peel strength between the adhesive layer and the substrate layer.

Solution to Problem

The present inventors have made intensive studies to solve the aforementioned problem in developing a multilayer sheet including an adhesive layer that includes an acid-modified polyolefin and a substrate layer that includes a polyphenylene ether. Specifically, the present invention was completed by examining various multilayer sheets in which a functional group was introduced into a substrate layer that includes a polyphenylene ether.

The means for solving the aforementioned problem include the following aspects.

[1] A multilayer sheet, including:

a substrate layer (A) that includes 40 to 99.9% by mass of a polyphenylene ether (a1), 0 to 59.9% by mass of a polystyrene (a2), and an amino group-containing polymer (a3); and an adhesive layer (B) that includes an acid-modified polyolefin.

[2] The multilayer sheet according to [1], in which a content of the amino group-containing polymer (a3) in the substrate layer (A) is from 2 to 40% by mass.

[3] The multilayer sheet according to [1] or [2], in which the substrate layer (A) has a softening point of 175° C. or higher.

[4] The multilayer sheet according to any one of [1] to [3], in which the substrate layer (A) has a storage modulus at 160° C. of 500 MPa or more.

[5] The multilayer sheet according to any one of [1] to [4], in which the amino group-containing polymer (a3) in the substrate layer (A) includes a polystyrene chain having an amino group at a terminal thereof.

[6] The multilayer sheet according to [5], in which the amino group-containing polymer (a3) in the substrate layer (A) is a styrene-diene-styrene block copolymer.

[7] The multilayer sheet according to any one of [1] to [6], in which the acid-modified polyolefin is a maleic anhydride-modified polyolefin.

[8] The multilayer sheet according to any one of [1] to [7], in which the substrate layer (A) has a thickness of from 50 to 300 µm and the adhesive layer (B) has a thickness of from 10 to 100 µm.

[9] A method of producing a multilayer sheet, the method including:

a step of bringing, in a molten state of 160° C. or higher, a substrate layer (A) that includes 40 to 99.9% by mass of a polyphenylene ether (a1), 0 to 59.9% by mass of a polystyrene (a2), and an amino group-containing polymer (a3) into contact with an adhesive layer (B) that includes an acid-modified polyolefin.

Advantageous Effects of Invention

According to the present invention, it is possible to provide a multilayer sheet including an adhesive layer that includes an acid-modified polyolefin and a substrate layer that includes a polyphenylene ether, and having high peel strength between the adhesive layer and the substrate layer.

By including the substrate layer (A) that includes an amino group-containing polymer (a3) and the adhesive layer (B) that includes an acid-modified polyolefin, a multilayer sheet with excellent adhesion strength and heat resistance can be produced. This makes it possible to provide high-performance and economical sheet-like battery members and the like.

BRIEF DESCRIPTION OF DRAWING

FIG. 1 is a calibration curve for converting the absorbance ratio of ethylene units to propylene units into mass ratio.

DESCRIPTION OF EMBODIMENTS

The multilayer sheet of the present invention includes a substrate layer (A) that includes a polyphenylene ether (a1) and an adhesive layer (B) that includes an acid-modified polyolefin. The substrate layer (A) is an intermediate layer or a surface layer, and the adhesive layer (B) is a surface layer. Here, the surface layer is a layer arranged as either an upper surface or a lower surface, and the intermediate layer is a layer other than the surface layer. When the adhesive layer (B) is provided only as one surface layer, the intermediate layer may not be present, and both the substrate layer (A) and the adhesive layer (B) may be surface layers. Examples of typical layer configurations include a two-layer sheet of substrate layer (A)/adhesive layer (B) and a three-layer sheet of adhesive layer (B)/substrate layer (A)/adhesive layer (B). If the interface strength between the substrate layer (A) and the adhesive layer (B) is insufficient, a tie layer (C) may be provided between both layers. The tie layer (C) is a layer that firmly bonds the substrate layer (A) and the adhesive layer (B). Examples of typical layer configurations when the tie layer (C) is provided include a three-layer sheet of substrate layer (A)/tie layer (C)/adhesive layer (B) and a five-layer sheet of adhesive layer (B)/tie layer (C)/substrate layer (A)/tie layer (C)/adhesive layer (B). In one embodiment of the present invention, it is preferred that the substrate layer (A) and the adhesive layer (B) are in direct contact with each other without the tie layer (C) interposed therebetween. In one embodiment of the present invention, the tie layer (C) may include a functional group capable of bonding with an amino group such as a carboxylic acid and a carboxylic anhydride. For example, the tie layer (C) may be a layer that includes an acid-modified polyolefin.

The substrate layer (A) includes a polyphenylene ether (a1). The polyphenylene ether (a1) may be a main component accounting for 40 to 99.9% by mass of the substrate layer (A). The mass ratio of the polyphenylene ether (a1) in the substrate layer (A) is preferably 50% by mass or more, more preferably 60% by mass or more, and particularly preferably 70% by mass or more. When the mass ratio of the polyphenylene ether (a1) falls within such a range, the heat resistance of the multilayer sheet can be improved. The mass ratio of the polyphenylene ether (a1) in the substrate layer (A) is preferably 98% by mass or less, and more preferably 95% by mass or less. When the mass ratio of the polyphenylene ether (a1) falls within such a range, the moldability of the multilayer sheet can be improved.

The substrate layer (A) may further include a polystyrene (a2). The polystyrene (a2) is different from an amino group-containing polymer (a3) and does not contain amino groups. The polystyrene (a2) may be a subcomponent accounting for 0 to 55.9% by mass of the substrate layer (A). The polystyrene (a2) is an optional component, and the substrate layer (A) may not include the polystyrene (a2). The mass ratio of the polystyrene (a2) in the substrate layer (A) is preferably 50% by mass or less, more preferably 40% by mass or less, and particularly preferably 30% by mass or less. When the mass ratio of the polystyrene (a2) falls within such a range, the heat resistance of the multilayer sheet can be improved.

Typical examples of the polystyrene (a2) include general-purpose polystyrene (GPPS), which is a polymer of styrene only, and high-impact polystyrene (HIPS), which is GPPS added with rubber to provide impact resistance, but a copolymer of styrene with acrylonitrile or (meth)acrylic acid ester can also be used therefor. The copolymer used as the polystyrene (a2) includes monomer units derived from styrene as a main component (for example, 50% by mass or more of the total monomer units). When the polystyrene (a2) is a copolymer, the mass ratio of monomer units derived from comonomers other than styrene in the polystyrene (a2) is preferably 20% by mass or less, and more preferably 10% by mass or less. When the mass ratio of monomer units derived from comonomers is 20% by mass or less, the compatibility with the polyphenylene ether (a1) is improved and phase separation can be prevented.

The total amount of the polyphenylene ether (a1) and the polystyrene (a2) in the substrate layer (A) is preferably 60% by mass or more, more preferably 70% by mass or more, and still more preferably 80% by mass or more. The total amount of the polyphenylene ether (a1) and the polystyrene (a2) in the substrate layer (A) is preferably 99.9% by mass or less, more preferably 98% by mass or less, and still more preferably 95% by mass or less.

The substrate layer (A) further includes an amino group-containing polymer (a3). The mass ratio of the amino group-containing polymer (a3) in the substrate layer (A) is preferably 0.1% by mass or more, more preferably 2% by mass or more, and particularly preferably 5% by mass or more. When the mass ratio of the amino group-containing polymer (a3) falls within such a range, the amino group-containing polymer (a3) sufficiently reacts with the acid-modified polyolefin in the adhesive layer (B), by which interlayer adhesion strength can be improved. The mass ratio of the amino group-containing polymer (a3) in the substrate layer (A) is preferably 40% by mass or less, and more preferably 30% by mass or less. When the mass ratio of the amino group-containing polymer (a3) falls within such a range, the heat resistance of the substrate can be maintained and the moldability of the multilayer sheet can be improved.

The amino group-containing polymer (a3) is not particularly limited as long as it has an amino group. The weight average molecular weight of the amino group-containing polymer (a3) is preferably 1,000 or more. The weight average molecular weight of the amino group-containing polymer (a3) is preferably 200,000 or less. When the weight average molecular weight is 1,000 or more, moldability and thermal stability are improved, and when the weight average molecular weight is 200,000 or less, the adhesion strength with the adhesive layer (B) or the tie layer (C) is improved. When the weight average molecular weight falls within such a range, both the physical properties of the substrate layer (A) and the adhesiveness to the adhesive layer (B) can be achieved. The weight average molecular weight is a standard polystyrene conversion value obtained using a gel permeation chromatography (GPC).

The amino group-containing polymer (a3) is preferably a polymer having an amino group at a terminal of the molecule, more preferably a polymer including a polystyrene chain having an amino group at a terminal, and particularly preferably a polymer including a polystyrene chain that has an amino group at a terminal and that has a molecular weight of 1,000 or more. In the polymer having an amino group at a terminal of the molecule, the amino group may be present only at one terminal or may be present at both terminals. A primary amine or a secondary amine can be preferably used as the terminal amino group.

Examples of methods of synthesizing a polystyrene chain having an amino group at a terminal include a method of end-capping the active terminal with a modifier after anionic living polymerization or radical living polymerization, and a method of radically polymerizing styrene in the presence of a chain transfer agent having an amino group.

The polymer synthesized by the method of introducing an amino group to the active terminal with a modifier after living polymerization is not limited to a styrene homopolymer, and may be a block copolymer including a styrene chain. However, in the case of a block copolymer, the chain to which an amino group is bonded is preferably a styrene chain. A styrene-diene block copolymer having an amino group at a terminal is preferably used because it is readily available as a commercial product.

Examples of the method of end-capping the active terminal with a modifier after anionic living polymerization include a method of anionically polymerizing styrene with an initiator such as butyllithium in a hydrocarbon solvent, adding a modifier such as 1,3-dimethyl-2-imidazolidinone after completion of the polymerization to cause an addition reaction with the terminal anion, and then treating the reaction product with protons. In the case of a styrene-diene block copolymer, a diene such as butadiene is anionically polymerized in a first step, styrene is added and anionically polymerized in a second step, and similarly a modifier is added to introduce an amino group. As the styrene-diene block copolymer, a block copolymer having a polystyrene block at a terminal chain, represented by a styrene-diene diblock copolymer and a styrene-diene-styrene triblock copolymer, is preferably used. A triblock copolymer is particularly preferably used because it is readily available as a commercial product.

Specific examples of polydiene blocks include polybutadiene, poly(ethylene-butylene), which is a hydrogenated product thereof, polyisoprene, poly(ethylene-propylene), which is a hydrogenated product thereof, and poly(butadiene-butylene), which is a partially hydrogenated product of polybutadiene.

Examples of the method of radically polymerizing styrene in the presence of a chain transfer agent having an amino group include a method of radically polymerizing styrene using an azo initiator or an organic peroxide in an organic solvent using 2-aminoethynethiol or a hydrochloride thereof as the chain transfer agent. When a hydrochloride is used as the chain transfer agent, it is neutralized with an equivalent amount of an alkali to be converted to an amine.

The amino group concentration in the substrate layer (A) is preferably 1 µeq or more, and more preferably 5 µeq or more. When the amino group concentration falls within this range, the interlayer adhesion strength to the adhesive layer (B) or the tie layer (C) can be improved. The amino group concentration in the substrate layer (A) is preferably 200 µeq or less, and more preferably 100 µeq or less. When the amino group concentration falls within this range, the heat resistance of the substrate layer (A) can be improved, and troubles such as coloring can be prevented.

A polymer other than (a1) to (a3) (hereinafter, referred to as other polymer (A)) can be added to the substrate layer (A) for the purpose of improving the toughness at a low temperature and molding stability and improving the adhesiveness with the adhesive layer (B) or the tie layer (C).

Examples of other polymers (A) include: styrene block copolymers such as styrene-butadiene-styrene block copolymers, hydrogenated products thereof, styrene-isoprene-styrene block copolymers, and hydrogenated products thereof; and graft copolymers obtained by grafting styrene homopolymers or copolymers to polyolefins. These copolymers include styrene units as subcomponents (for example, 40% by mass or less of the total monomer units). Having a polystyrene chain enables the other polymer (A) to have high miscibility with the polyphenylene ether (a1).

As the other polymer (A), an unmodified polyolefin such as polyethylene, polypropylene, or an ethylene-propylene copolymer may be used. By including a polyolefin in the substrate layer (A), it can be expected that the adhesion strength with the adhesive layer (B) or the tie layer (C) including the same polyolefin resin is improved. Since these polyolefins are completely incompatible with the polyphenylene ether (a1), it is preferable to use the aforementioned copolymer including styrene units as a compatibilizer.

When the other polymer (A) is used, the content of the other polymer (A) in the substrate layer (A) is preferably 1% by mass or more, more preferably 2% by mass or more, and particularly preferably 3% by mass or more. When the addition amount falls within such a range, the improvement effect of the other polymer (A) is enhanced.

When the other polymer (A) is used, the content of the other polymer (A) in the substrate layer (A) is preferably 30% by mass or less, more preferably 20% by mass or less, and particularly preferably 10% by mass or less. When the addition amount falls within such a range, the multilayer sheet can have high heat resistance and high adhesion strength at high temperature.

The softening point of the substrate layer (A) is preferably 175° C. or higher, more preferably 180° C. or higher, and particularly preferably 185° C. or higher. When the softening point falls within this range, the heat resistance of the multilayer sheet is improved.

The storage modulus of the substrate layer (A) at 160° C. is preferably 500 MPa or more. More preferably, the storage modulus of the substrate layer (A) at 170° C. is 500 MPa or more. When the storage modulus at the temperature range is 500 MPa or more, the multilayer sheet can be prevented from being deformed or damaged by thermocompression bonding during adhesion.

Here, the softening point and the storage modulus in the present invention are values obtained using a tensile viscoelasticity apparatus (DMS6100, manufactured by Hitachi High-Tech Science Corporation). Specifically, the temperature is raised from room temperature to 250° C. at a frequency of 1 Hz and a temperature rising rate of 2° C./min, and changes in storage modulus, loss modulus, and tan Δ due to temperature are recorded. The softening point as used in the present invention means a temperature at which the value of tan Δ shows the maximum value.

The melt flow rate of the substrate layer (A) is preferably 1 g/10 min or more, and more preferably 2 g/10 min or more. The melt flow rate of the substrate layer (A) is preferably 50 g/10 min or less, and more preferably 30 g/10 min or less. If the melt flow rate of the substrate layer (A) is below the lower limit, the melt viscosity becomes high and sheet molding becomes difficult. If the melt flow rate is above the upper limit, the melt tension becomes too low and sheet molding becomes also difficult.

Here, the melt flow rate is a value measured according to JIS K7210:2014. The melt flow rate of the substrate layer (A) is measured at a resin temperature of 300° C. and a load of 2.16 kg.

The substrate layer (A) may further include an additive selected from the group consisting of antioxidants, ultraviolet absorbers, fillers, reinforcing fibers, release agents, processing aids, flame retardants, plasticizers, nucleating agents, antistatic agents, pigments, dyes, foaming agents, and combinations thereof.

The adhesive layer (B) includes an acid-modified polyolefin. The acid-modified polyolefin is a polyolefin that is obtained by graft-modifying an unmodified polyolefin (hereinafter, also simply referred to as "polyolefin") with an acid compound selected from the group consisting of unsaturated carboxylic acids, unsaturated carboxylic acid anhydrides, and combinations thereof.

Examples of monomer units constituting polyolefins include monomer units derived from monomers selected from the group consisting of α-olefins such as ethylene, propylene, 1-butene, 1-pentene, 1-hexene, and 4-methyl-1-pentene, diene monomers such as butadiene, isoprene, and chloroprene, aromatic vinyl compounds such as styrene, and combinations thereof. The number of carbon atoms in the monomer is preferably from 2 to 10, and more preferably from 2 to 5.

Among these, polyolefins selected from the group consisting of polymer blends of polyethylene and polypropylene, ethylene-propylene copolymers, and combinations thereof are preferred because they have high adhesion strength to adherends.

Polyethylene is a polymer including ethylene units as a main component, and may be a homopolymer or may be a copolymer. In the case of a copolymer, the content of ethylene units in polyethylene is preferably 50% by mass or more, and may be 70% by mass or more. Specific examples of polyethylene include homopolymers such as low-density polyethylene, high-density polyethylene, and linear low-density polyethylene, copolymers such as ethylene-diene monomer copolymers, ethylene-vinyl acetate copolymers, ethylene-acrylic acid ester copolymers, and ethylene-methacrylic acid ester copolymers, and halogen-modified products such as chlorinated polyethylene.

Polypropylene is a polymer including propylene units as a main component, and may be a homopolymer or may be a copolymer. In the case of a copolymer, the content of propylene units in polypropylene is preferably 50% by mass or more, and may be 70% by mass or more. Specific examples of polypropylene include homopolymers such as amorphous polypropylene and crystalline polypropylene, copolymers such as propylene-diene monomer copolymers, and halogen modified products such as chlorinated polypropylene.

The ethylene-propylene copolymer is a polymer including ethylene units and propylene units, and may be composed only of ethylene units and propylene units, or may further include other monomer units in addition to ethylene units and propylene units. Examples of ethylene-propylene copolymers including other monomer units include ethylene-propylene-diene monomer copolymers. The total amount of ethylene units and propylene units in the ethylene-propylene copolymer is preferably 50% by mass or more, more preferably 70% by mass or more, still more preferably 80% by mass or more, particularly preferably 90% by mass or more, and may be 100% by mass.

In addition to physical blends consisting of multiple components of these resins, polyolefins encompass reaction blends in which functional groups are reacted between different polymers in a molding machine, graft copolymers and block copolymers consisting of multiple segments, and compositions in which physical blends using these as compatibilizers are microdispersed.

In all the monomer units contained in the polyolefin, the total amount of ethylene units and propylene units is preferably 50% by mass or more, more preferably 70% by mass or more, still more preferably 80% by mass or more, particularly preferably 90% by mass or more, and may be 100% by mass.

The mass ratio of ethylene units to propylene units contained in the polyolefin (ethylene units/propylene units) is preferably from 10/90 to 40/60, and more preferably from 15/85 to 35/65. When the mass ratio of ethylene units is equal to or more than the lower limit of this range, the thermocompression bondability of the acid-modified polyolefin can be improved, and the adhesion strength can be improved. When the mass ratio of ethylene units is equal to or less than the upper limit of this range, the adhesion strength at high temperature can be improved. When the mass ratio of ethylene units to propylene units falls within the range shown above, it is possible to achieve both adhesion durability at high temperature and adhesion durability at low temperature. When the polyolefin is a polymer blend of polyethylene and polypropylene, the "mass ratio of ethylene units to propylene units contained in the polyolefin" means a mass ratio of ethylene units to propylene units with respect to all ethylene units and propylene units contained in polyethylene and polypropylene.

The mass ratio of ethylene units and propylene units is determined from the absorbance ratio of the characteristic absorption of polyethylene ($719\ cm^{-1}$) and the characteristic absorption of polypropylene ($1167\ cm^{-1}$) in the IR spectrum. Specifically, a calibration curve is used to convert the absorbance ratio of ethylene units to propylene units into mass ratio. A calibration curve can be created by blending commercially available polyethylene and polypropylene at various ratios and plotting the blending ratio and the absorbance ratio. Specifically, refer to Examples described later.

Each of polyethylene, polypropylene, and ethylene-propylene copolymer may include monomer units other than ethylene units and propylene units. Examples of other monomers that forms monomer units other than ethylene units and propylene units include α-olefins such as 1-butene, 1-pentene, 1-hexene, and 4-methyl-1-pentene, diene monomers such as butadiene, isoprene, and chloroprene, unsaturated carboxylic acids and derivatives thereof such as vinyl acetate, acrylic acid esters, acrylic acid, methacrylic acid, and methacrylic acid esters, and aromatic vinyl compounds such as styrene. The content of monomer units other than ethylene units and propylene units in the polyolefin is preferably 30% by mass or less, more preferably 20% by mass or less, and particularly preferably 10% by mass or less. When the content of monomer units other than ethylene units and propylene units falls within such a range, properties such as water resistance, chemical resistance, and durability of polyolefin are enhanced, and polyolefin can be produced at low cost.

Examples of methods of producing polyolefin include known production methods using a polymerization catalyst. Examples of polymerization catalysts include Ziegler catalysts and metallocene catalysts, and examples of polymerization methods include slurry polymerization and gas phase polymerization. Impact resistant polypropylene, referred to as polypropylene block polymer, is substantially a mixture of polypropylene and propylene-ethylene random copolymer, and can be produced by a process of a first step to obtain a homopolymer of propylene and a second step to obtain a propylene-ethylene random copolymer.

The acid compound used in producing the acid-modified polyolefin is selected from the group consisting of unsaturated carboxylic acids, unsaturated carboxylic acid anhydrides, and combinations thereof.

An unsaturated carboxylic acid is a compound having an ethylenic double bond and a carboxylic acid group in the same molecule, and examples thereof include various unsaturated monocarboxylic acids and unsaturated dicarboxylic acids. These acid compounds may be used singly or in combination of two or more.

Specific examples of unsaturated monocarboxylic acids include acrylic acid, methacrylic acid, crotonic acid, and isocrotonic acid.

Specific examples of unsaturated dicarboxylic acids include maleic acid, fumaric acid, itaconic acid, citraconic acid, nadic acid, and endic acid.

An unsaturated carboxylic acid anhydride is a compound having an ethylenic double bond and a carboxylic acid anhydride group in the same molecule, and examples thereof include acid anhydrides of the aforementioned unsaturated dicarboxylic acids. Specific examples of acid anhydrides of unsaturated dicarboxylic acids include maleic anhydride, fumaric anhydride, itaconic anhydride, citraconic anhydride, nadic anhydride, and endic anhydride.

Among these, maleic acid and maleic anhydride are preferably used, and maleic anhydride is particularly preferably used, because of their high modification effect.

A known method can be adopted as a graft modification method. Examples thereof include a method of graft-reacting, in a molten state or in a solution state, an acid compound with a polyolefin in the presence of a radical polymerization initiator such as an organic peroxide or an aliphatic azo compound.

The graft reaction temperature is preferably from 80 to 160° C. when reacting in a solution state, and is preferably from 150 to 300° C. when reacting in a molten state. In each of the solution state and the molten state, the reaction rate increases at a temperature equal to or higher than the lower limit of the aforementioned reaction temperature range, and decrease in the molecular weight of the resin can be suppressed at a temperature equal to or lower than the upper limit of the aforementioned reaction temperature range, by which the mechanical strength of the resulting acid-modified polyolefin can be maintained.

The radical polymerization initiator to be used may be selected from commercially available organic peroxides in consideration of the reaction temperature or the like.

If the acid compound used for graft modification is partially unreacted, it is preferable to remove the unreacted acid compound by a known method such as distillation under reduced pressure in order to suppress adverse effects on adhesion strength.

The amount of the acid compound grafted to the acid-modified polyolefin is preferably 0.2% by mass or more, and more preferably 0.4% by mass or more. When the amount of the grafted acid compound falls within such a range, the adhesiveness of the adhesive layer (B) can be enhanced.

The amount of the acid compound grafted to the acid-modified polyolefin is preferably 5% by mass or less, and more preferably 2% by mass or less. When the amount of the grafted acid compound falls within such a range, deterioration of physical properties due to reduction in molecular weight can be suppressed.

In this specification, the amount of the acid compound grafted to the acid-modified polyolefin is defined by the following formula from the acid value of the acid-modified polyolefin.

$$\text{Graft amount (\% by mass)} = \text{acid value} \times M \times 100 \big/ \left(1{,}000 \times 56.1 \times V\right)$$

11

In the formula, M and V are defined by the following formulae.

$$M = \text{(molecular weight of acid compound)} +$$
$$\text{(number of unsaturated groups in acid compound)} \times 1.008$$

V=valence of acid group (however, when an acid anhydride group is contained, it is a valence of the acid group when the acid anhydride group is completely hydrolyzed)

The acid value indicates the number of milligrams of potassium hydroxide required to neutralize the acid contained in 1 g of the sample, and is measured according to JIS K 0070:1992.

The melting point of the acid-modified polyolefin is preferably 130° C. or higher, and more preferably 135° C. or higher. When the melting point of the acid-modified polyolefin falls within such a range, the heat resistance and adhesion strength at high temperature of the adhesive layer (B) can be improved.

The melting point of the acid-modified polyolefin is preferably 160° C. or lower, and more preferably 150° C. or lower. When the melting point of the acid-modified polyolefin falls within such a range, good thermocompression bondability can be obtained, and adhesion durability at low temperature can be improved.

In the present invention, the melting point means a temperature at the top of the endothermic peak generated in the process of once holding at 180° C. for several minutes, followed by cooling to 0° C., and then raising to 200° C. by 10° C. per minute using a differential scanning calorimeter (DSC).

The melt flow rate of the acid-modified polyolefin is preferably 3 g/10 min or more, and more preferably 7 g/10 min or more. The melt flow rate of the acid-modified polyolefin is preferably 50 g/10 min or less, and more preferably 30 g/10 min or less.

Here, the melt flow rate is a value measured according to JIS K7210:2014. The melt flow rate of the adhesive layer (B) is measured at a resin temperature of 230° C. and a load of 2.16 kg.

The content of the acid-modified polyolefin in the adhesive layer (B) may be 2% by mass or more. For example, the acid-modified polyolefin may be used by mixing with an unmodified polyolefin, and when an acid-modified polyolefin with a high degree of acid modification is used, it may be used at a small amount of about 2% by mass. In one embodiment, the content of the acid-modified polyolefin in the adhesive layer (B) is preferably 30% by mass or more, more preferably 70% by mass or more, may be particularly 90% by mass or more, and may be 100% by mass.

A polymer other than the acid-modified polyolefin (hereinafter, referred to as other polymer (B)) can be added to the adhesive layer (B) for the purpose of improving adhesion strength at low temperature, adhesion durability, molding stability, and adhesiveness with the substrate layer (A). Examples of other polymers (B) include styrene-based block copolymers such as styrene-butadiene-styrene block copolymers and hydrogenated products thereof, styrene-isoprene-styrene block copolymers and hydrogenated products thereof, and styrene-isobutylene-styrene block copolymers and hydrogenated products thereof, and styrene-based graft copolymers obtained by grafting styrene homopolymer or styrene copolymer to polyolefin. Also, an unmodified polyolefin such as polyethylene, polypropylene, and an ethylene-propylene copolymer may be added as the other polymer (B).

When the other polymer (B) is used, the lower limit of the content of the other polymer (B) in the adhesive layer (B) is preferably 1% by mass or more, more preferably 2% by mass or more, and particularly preferably 3% by mass or more. When the addition amount falls within such a range, the improvement effect of the other polymer (B) is enhanced.

When the other polymer (B) is used, the upper limit of the content of the other polymer (B) in the adhesive layer (B) is preferably 50% by mass or less, more preferably 30% by mass or less, and particularly preferably 10% by mass or less. When the addition amount falls within such a range, the adhesive layer (B) can obtain high heat resistance and high adhesion strength at high temperature. As described above, when an acid-modified polyolefin having a high degree of acid modification is used, the content of the acid-modified polyolefin can be reduced. In such cases, the content of the unmodified polyolefin may be high, and the upper limit of the content of the unmodified polyolefin in the adhesive composition may be 98% by mass.

The adhesive layer (B) may further include an additive selected from the group consisting of antioxidants, ultraviolet absorbers, fillers, reinforcing fibers, release agents, processing aids, flame retardants, plasticizers, nucleating agents, antistatic agents, pigments, dyes, foaming agents, and combinations thereof.

The multilayer sheet of the present invention can be strongly adhered to adherends. When the adhesive layer (B) of the multilayer sheet is adhered to an adherend, particularly a SUS304 plate having a thickness of 0.1 mm, to prepare a bonded body, the normal temperature peel strength between the multilayer sheet and the adherend, particularly between the multilayer sheet and the SUS304 plate having a thickness of 0.1 mm, is 2 N/10 mm or more, and more preferably 5 N/mm or more. Here, the normal temperature is 23° C., and the normal temperature peel strength is measured under the conditions described in Examples described later.

The substrate layer (A) preferably has a thickness within a range of from 50 to 300 μm. When the thickness of the substrate layer (A) is equal to or more than this lower limit, sufficient rigidity is obtained. When the thickness of the substrate layer (A) is equal to or less than this upper limit, influence on the thickness of an article incorporated with the multilayer sheet such as a battery can be reduced. On the other hand, the adhesive layer (B) preferably has a thickness of from 10 to 100 μm. When the thickness of the adhesive layer (B) is equal to or more than this lower limit, occurrence of poor adhesion can be suppressed. When the thickness of the adhesive layer (B) is equal to or less than this upper limit, it is possible to prevent the adhesive from spreading out from the multilayer sheet and to prevent defects from occurring in an article incorporated with the multilayer sheet such as a battery. By controlling the thickness of the multilayer sheet within such a range, the multilayer sheet and the bonded body using the same can exhibit excellent adhesion performance, durability, productivity, and economic efficiency.

Each of the substrate layer (A) and the adhesive layer (B) is generally produced from a resin composition, which is a raw material. The resin composition, which is the raw material of each of the substrate layer (A) and the adhesive layer (B), is a composition mainly composed of a resin, which is composed of the components of the substrate layer (A) or the adhesive layer (B) described above. The resin composition can be produced, for example, by a method of melt-kneading the resin as a main component and, if necessary, other components with an extruder, Banbury mixer, hot rolls, or the like, cooling and solidifying with water or the like while pulling a strand extruded from the nozzle hole of the die head, and cutting into pellets.

The melt-kneading temperature of the resin composition used for the substrate layer (A) is preferably from 150 to 320° C. and more preferably from 180 to 300° C., and the kneading time is usually from 0.5 to 20 minutes and preferably from 1 to 15 minutes.

The melt-kneading temperature of the resin composition used for the adhesive layer (B) is preferably from 150 to 270° C. and more preferably from 170 to 250° C., and the kneading time is usually from 0.5 to 20 minutes and preferably from 1 to 15 minutes.

The resin composition used for the substrate layer (A) and the resin composition used for the adhesive layer (B) thus obtained can be made into multilayer sheets of various shapes according to the application by conventionally known methods such as compression molding, injection molding, extrusion molding, multilayer extrusion molding, profile extrusion molding, or hollow molding.

The substrate layer (A), the adhesive layer (B), and, if necessary, the tie layer (C) may be prepared in advance as sheets and multi-layered by heat lamination, or may be multi-layered by simultaneously forming sheets and multi-layering like multilayer extrusion molding. In either case, it is preferable to bring at least one of the adjacent layers into contact in a molten state. The contact temperature is preferably 160° C. or higher, more preferably 190° C. or higher, and particularly preferably 220° C. or higher. When the contact temperature is equal to or higher than the lower limit, the acid group or the acid anhydride group contained in the adhesive layer (B) and the amino group contained in the substrate layer (A) form a bond, which can improve interlayer adhesion strength.

The multilayer sheet of the present invention is preferably formed into a sheet by multilayer extrusion molding from the viewpoint of productivity and manufacturing cost. In general extrusion molding, a layered molten resin extruded from a T-die is cooled and stretched by rolls or the like to form a sheet. "Co-extrusion", in which multiple resins are extruded at the same time, enables multilayer molding. Specific methods of co-extrusion include "feed block method" in which the resins are merged before the T-die, and "multi-manifold method" in which the single layers are spread in a manifold and then merged at the lip, which is a discharge port of the T-die. Any of these methods may be used in the production of the multilayer sheet of the present invention, and other methods may also be used.

The multilayer sheet of the present invention can be adhered to adherends made of various materials such as metals, glass, ceramics, and plastics. Thereby, a bonded body including the multilayer sheet and the adherend can be produced. For example, a bonded body including the multilayer sheet can be used as a member or a component of a layered battery.

The metal used as the adherend may be a generally known metal plate, flat metal plate, or metal foil, and iron, copper, aluminum, lead, zinc, titanium, chromium, stainless steel, etc. can be used therefor. Among these, iron, aluminum, titanium, and stainless steel are particularly preferred.

Various thermoplastic resins or thermosetting resins can be used for the plastic used as the adherend. A composite material in which an inorganic material such as glass or ceramics, a filler such as metal or carbon, or a fiber is compounded with a resin may be used.

EXAMPLE

Examples are shown below to describe the present invention more specifically. In the following description, "parts" means parts by mass and "%" means % by mass, unless otherwise specified. Further, "PPE" means polyphenylene ether, "PS" means polystyrene, "PP" means polypropylene, "PE" means polyethylene, and "MAH" means maleic anhydride, unless otherwise specified.

[Adhesive Layer (B)]

Maleic anhydride-modified polyolefins A to B were prepared, the main components of which were polypropylene, polyethylene, ethylene-propylene copolymer, and maleic anhydride-modified products thereof. The PE/PP blending ratio of the maleic anhydride-modified polyolefins A to B and the amount of maleic anhydride were confirmed by the procedures described in (1) and (2) below.

(1) PE/PP Blending Ratio

Commercially available polyethylene resin (P9210, manufactured by Keiyo Polyethylene Co., Ltd.) and polypropylene resin (Waymax MFX3, manufactured by Japan Polypropylene Co., Ltd.) were melt-kneaded with an extruder at various blending ratios, and the resulting resin mixture was molded using a desktop press molding machine to produce a resin sheet with a thickness of about 2 mm.

Using Spectrum 100, manufactured by PerkinElmer, an IR spectrum was obtained from the cut surface of the resin sheet by the attenuated total reflection method (ATR method). The PE absorbance ratio was determined from the absorbance at 719 cm$^{-1}$ (PE characteristic absorption) and the absorbance at 1167 cm$^{-1}$ (PP characteristic absorption) in the obtained IR spectrum. A calibration curve was created by plotting this absorbance ratio and the blending ratio at the time of melt-kneading. The results of the PE blending ratio and the PE absorbance ratio are shown in Table 1, and the results of the plot are shown in FIG. 1.

The number of repetitions was set to 4 or more in consideration of measurement errors. The approximation curve of this plot was utilized as a calibration curve for determining the PE/PP blending ratio.

TABLE 1

| PE mixing ratio (wt %) | PE absorbance ratio (%) |
|---|---|
| 0 | 3, 1, 3, 2 |
| 10 | 35, 41, 36, 32, 34, 33, 38 |
| 20 | 43, 56, 47, 48, 50, 46, 46 |
| 30 | 61, 62, 61, 66, 58, 58, 57, 64, 64, 66, 64, 63, 63 |
| 50 | 81, 83, 83, 74, 77, 75 |
| 70 | 91, 92, 91, 88, 85, 89 |
| 100 | 100, 100, 98, 96, 99 |

The maleic anhydride-modified polyolefins A to B were molded into resin sheets with a thickness of 2 mm, and the IR spectrum was similarly measured using the cross section thereof as the measurement surface. Based on the obtained IR spectrum, the created calibration curve was used to determine the PE/PP blending ratio of the maleic anhydride-modified polyolefins A to B. The results are shown in Table 2.

(2) Amount of Maleic Anhydride

In addition, the amount of maleic anhydride grafted in the maleic anhydride-modified polyolefins A to B was quantified by neutralization titration. In the neutralization titration, the maleic anhydride-modified polyolefins A to B as samples were heated and dissolved in xylene, and the obtained solution was titrated with an ethanol solution of potassium hydroxide using phenol red as an indicator. The amount of maleic anhydride was calculated from the titration results. The results for the amount of maleic anhydride are shown in Table 2.

(3) Melt Flow Rate

The melt flow rate (MFR) was measured using a commercially available melt indexer (G-02, manufactured by Toyo Seiki Seisakusho Co., Ltd.) in accordance with JIS K7210:2014 at a resin temperature of 230° C. and a load of 2.16 kg. The results are shown in Table 2.

TABLE 2

| Maleic anhydride-modified polyolefin | Blending ratio (wt %) | | MAH amount (wt %) | MFR (g/10 min) |
|---|---|---|---|---|
| | PP | PE | | |
| A | 18 | 82 | 0.7 | 14.2 |
| B | 22 | 78 | 1.5 | 16.3 |

[Substrate Layer (A)]

First, amino-terminated polystyrene (AT-PS) used for the substrate layer (A) was prepared according to the synthesis example below. Commercially available products were used for other materials. Details of these will be described later.

[Synthesis Example] Synthesis of
Amino-Terminated Polystyrene (AT-PS)

A mixed solvent consisting of 90 parts of isopropyl alcohol (IPA) and 10 parts of distilled water was prepared. 30 parts of styrene, 40 parts of the mixed solvent, and 1.5 parts of 2-aminoethanethiol hydrochloride were added to a glass flask equipped with a reflux condenser, a nitrogen inlet tube, a thermometer, two dropping funnels, and a stirrer, stirred, heated, and refluxed. 70 parts of styrene was added in one dropping funnel, a solution obtained by dissolving 3.5 parts of 2-aminoethanethiol hydrochloride and 0.2 parts of 2,2'-azobis-(2-methylbutyronitrile) (hereinafter, referred to as ABN-E) in 17.5 parts of the mixed solvent was added in the other dropping funnel, and both were added dropwise for 2 hours under reflux. Subsequently, a solution of 0.1 parts of ABN-E and 2.5 parts of the mixed solvent was added dropwise for 1 hour, and a solution of 0.8 parts of ABN-E and 40 parts of the mixed solvent was added dropwise for 2 hours. Thereafter, the mixture was refluxed for 2 hours to complete the polymerization, and sodium hydroxide was added in an amount equivalent to the total addition amount of 2-aminoethanethiol hydrochloride, to convert it to an amine. The polymerization liquid was diluted with methyl ethyl ketone until it became transparent, and a large amount of methanol was poured therein to precipitate polystyrene, which was then filtered, washed, and dried to obtain a powder of amino-terminated polystyrene. The polystyrene conversion molecular weight determined by gel permeation chromatography was 3,000 in terms of number average molecular weight and 5,100 in terms of weight average molecular weight.

The resins (PPE/PS and amino group-containing polymer) described in "Substrate layer (A) composition" in Table 3 below were melt-kneaded at the blending ratio (% by mass) described in Table 3 to obtain a resin composition for the substrate layer (A). The melt flow rate, softening point, storage modulus, creep amount, and thermal change rate of the obtained resin composition for the substrate layer (A) were measured as described in (1) to (4) below. The results are shown in Table 3 together with the composition.

(1) Melt Flow Rate

The melt flow rate (MFR) was measured using a commercially available melt indexer (G-02, manufactured by Toyo Seiki Seisakusho Co., Ltd.) in accordance with JIS K7210:2014 at 300° C. and a load of 2.16 kg.

(2) Softening Point and Storage Modulus

The softening point and storage modulus are values obtained using a tensile viscoelasticity apparatus (DMS6100, manufactured by Hitachi High-Tech Science Corporation). Specifically, the temperature was raised from room temperature to 250° C. at a frequency of 1 Hz and a temperature rising rate of 2° C./min, and changes in storage modulus, loss modulus, and tan Δ due to temperature were recorded. The softening point was defined as a temperature at which the value of tan Δ showed the maximum value.

(3) Compression Creep Test

The resin composition for the substrate layer (A) was molded into a sheet with a thickness of 1 mm using a desktop press molding machine. This resin sheet was cut into a size of 10 mm×10 mm, and five sheets were layered to prepare a sample with a thickness of 5 mm. Using a hot press machine (Digital Press CYPT-50, manufactured by Sintokogio, Ltd.), heating was performed at a temperature of 170° C. and a pressure of 6 MPa for 12 hours, and the creep amount (%) was calculated from the change in thickness.

(4) Thermal Shrinkage Test

The resin composition for the substrate layer (A) was molded into a sheet with a thickness of about 100 μm using a desktop press molding machine. This resin sheet was cut into a size of 200 mm×100 mm to prepare a sample. The prepared sample was suspended within a dryer at 180° C. for 30 seconds, and the thermal change rate was calculated from the dimensional change before and after heating. The thermal change rate is an average of the absolute value of the change rate at the long side and the absolute value of the change rate at the short side.

[Three-Layer Sheet]

In each example, using the resin composition for the substrate layer (A) and the maleic anhydride-modified polyolefin for the adhesive layer (B) shown in Table 3, a three-layer sheet was prepared and evaluated as described below.

The resin composition for the substrate layer (A) was made into a substrate layer (A) with a thickness of about 150 μm using a desktop press molding machine. The maleic anhydride-modified polyolefin for the adhesive layer (B) was made into an adhesive layer (B) with a thickness of about 50 μm using a desktop press molding machine. The substrate layer (A) and the adhesive layer (B) were layered in the order of adhesive layer (B)/substrate layer (A)/adhesive layer (B), and thermocompression bonding was performed for 10 seconds at the compression bonding temperature shown in Table 3 using the same desktop press molding machine to obtain a three-layer sheet.

[Test Piece]

A SUS304 plate with a thickness of 0.1 mm was used as an adherend, and both surfaces of the three-layer sheet were sandwiched between SUS304 plates and thermocompression bonded (160° C., 10 seconds, 0.3 MPa) with a precision press to prepare a bonded body. This bonded body was cut into strips with a width of 10 mm to obtain test pieces. The adhesive portion of the test piece had a width of 10 mm and a length of 15 mm. The normal temperature peel strength, hot water peel strength, and constant load immersion fall time of the obtained test pieces were measured as described in (1) to (3) below.

(1) Normal Temperature Peel Test

In the normal temperature peel test, the SUS304 plate was peeled at a tensile speed of 50 mm/min using a tensile tester manufactured by Instron (Instron 5564), and the peel strength in a stable region was taken as the peel strength. The results are shown in Table 3 as normal temperature peel strength (N/10 mm).

(2) Hot Water Peeling Test

In the hot water peeling test, a load cell eDPU-50N manufactured by Imada Co., Ltd. was attached to a measurement stand MX2-1000N manufactured by Imada Co., Ltd., a heated water tank with a hook attached to the bottom was filled with hot water at 95° C., and the test piece was peeled while immersed in it to evaluate the peel strength in the same manner. The results are shown in Table 3 as hot water peel strength (N/10 mm).

(3) Adhesion Durability in Water

A constant load immersion test was conducted to evaluate the adhesion durability in water. The constant load immersion test is a test method in which a test piece is held in hot water at 95° C. under a constant peeling load, and adhesion durability is evaluated by the time (fall time) until the SUS304 plate is peeled off. The test pieces are the same as those used for measuring the peel strength. One of the handle portions of the test piece was connected to a fixed base with a wire, and the other was connected to a weight. The test piece was suspended in hot water at 95° C. together with the weight from the fixed base placed above the water surface, and a peeling load (1 N) was applied by the weight in water. At this time, the time required for the SUS304 plate as the adherend to be completely separated (fall time) was measured. The results are shown in Table 3 as constant load immersion fall time (hr).

The details of the resins used for the substrate layer (A) in Table 3 are as follows.

1000H: manufactured by Asahi Kasei Corporation, PPE-PS alloy Zylon 1000H, Tg=184° C. (DSC)

PX100F: manufactured by Mitsubishi Engineering Plastics Corporation, PPE PX100F, Tg=204° C. (DSC)

MP10: manufactured by Asahi Kasei Corporation, terminal amine-modified hydrogenated styrene thermoplastic elastomer (SEBS), Tuftec MP10, styrene content 30%

AT-PS: terminal amino-type polystyrene obtained by the method shown in the synthesis example As can be seen from the results in Table 3, the addition of the amino group-containing polymer significantly improved the adhesion strength with the adhesive layer (B) and the durability.

INDUSTRIAL APPLICABILITY

The multilayer sheet of the present invention is useful for bonding and sealing metals and other materials, and can be suitably used for applications in which a resulting bonded body may come into contact with moisture continuously or intermittently. Since the multilayer sheet has a substrate layer (A) with excellent rigidity and heat resistance, it is useful as a constituent member of a battery, and can contribute to a reduction in the number of parts and cost of the battery and a significant improvement in productivity.

Examples of other applications include electric wires and cables in which metal conductors or optical fibers are coated with resin moldings, automotive mechanical parts, automotive exterior parts, automotive interior parts, molded substrates for power supply, light reflectors for light source reflection, fuel cases for solid methanol batteries, heat insulating materials for metal pipes, heat insulating materials for vehicles, fuel cell water pipes, decorative moldings, water cooling tanks, boiler exterior cases, ink peripheral parts and members for printers, water pipes, joints, second-

TABLE 3

| | | Comparative Example 1 | Example 1 | Example 2 | Example 3 | Example 4 | Example 5 | Example 6 | Example 7 |
|---|---|---|---|---|---|---|---|---|---|
| Substrate layer (A) composition | <PPE/PS> | | | | | | | | |
| | 1000H (%) | 100 | 90 | 80 | | | | | |
| | PX100F (%) | | | | 90 | 80 | 70 | 95 | 90 |
| | <Amino group-containing polymer> | | | | | | | | |
| | MP10 (%) | | 10 | 20 | 10 | 20 | 30 | | |
| | AT-PS (%) | | | | | | | 5 | 10 |
| Adhesive layer (B) composition | MAH modified polyolefin | A | A | A | A | A | A | B | B |
| | MAH content (%) | 0.7 | 0.7 | 0.7 | 0.7 | 0.7 | 0.7 | 1.5 | 1.5 |
| Substrate layer (A) property | Softening point (° C.) | 196 | 195 | 194 | 216 | 216 | 215 | 192 | 186 |
| | 160° C. Storage modulus (MPa) | 1,985 | 1,526 | 1,248 | 1,480 | 1,269 | 1,005 | 1,720 | 1,470 |
| | 170° C. Storage modulus (MPa) | 1,779 | 1,395 | 1,159 | 1,330 | 1,213 | 963 | 1,560 | 820 |
| | MFR (g/10 min) | 5.7 | 6.2 | 6.7 | 4.5 | 4.8 | 5.1 | 5.6 | 7.4 |
| Substrate layer (A) heat resistance test | Compression creep test/ creep amount (%) | 14 | 18 | 23 | 20 | 22 | 26 | 18 | 29 |
| | Thermal shrinkage test/ thermal change rate (%) | 0.07 | 0.07 | 0.21 | 0.05 | 0.11 | 0.17 | 0.13 | 0.25 |
| Adhesion test of three-layer sheet | Compression bonding temperature (° C.) | 260 | 280 | 280 | 280 | 280 | 280 | 280 | 280 |
| | Normal temperature peel strength (N/10 mm) | <1 | 5.5 | 6.2 | 4.9 | 6.0 | 7.2 | 4.1 | 4.6 |
| | Hot water peel strength (N/10 mm) | <1 | 3.8 | 4.1 | 4.0 | 4.3 | 5.2 | 4.0 | 4.5 |
| | Constant load immersion fall time (hr) | <1 | 180 | >500 | 283 | >500 | >500 | 212 | 410 | ary battery alkaline storage battery tanks, and gasket sealing materials for various layered batteries.

The disclosure of Japanese Patent Application No. 2021-075960, filed Apr. 28, 2021, is incorporated herein by reference in its entirety.

What is claimed is:

1. A multilayer sheet, comprising:

a substrate layer (A) that comprises 40 to 99.9% by mass of a polyphenylene ether (a1), 0 to 59.9% by mass of a polystyrene (a2), and an amino group-containing polymer (a3); and an adhesive layer (B) that comprises an acid-modified polyolefin, wherein the substrate layer (A) has a softening point of 175° C. or higher.

2. The multilayer sheet according to claim 1, wherein a content of the amino group-containing polymer (a3) in the substrate layer (A) is from 2 to 40% by mass.

3. The multilayer sheet according to claim 1, wherein the substrate layer (A) has a softening point of 180° C. or higher.

4. The multilayer sheet according to claim 1 wherein the substrate layer (A) has a storage modulus at 160° C. of 500 MPa or more.

5. The multilayer sheet according to claim 1, wherein the amino group-containing polymer (a3) in the substrate layer (A) comprises a polystyrene chain having an amino group at a terminal thereof.

6. The multilayer sheet according to claim 5, wherein the amino group-containing polymer (a3) in the substrate layer (A) is a styrene-diene-styrene block copolymer.

7. The multilayer sheet according to claim 1, wherein the acid-modified polyolefin is a maleic anhydride-modified polyolefin.

8. The multilayer sheet according to claim 1, wherein the substrate layer (A) has a thickness of from 50 to 300 μm and the adhesive layer (B) has a thickness of from 10 to 100 μm.

9. The multilayer sheet according to claim 1, wherein the adhesive layers (B) are arranged on both upper and lower surfaces of the multilayer sheet.

10. A method of producing a multilayer sheet, the method comprising:

bringing, in a molten state of 160° C. or higher, a substrate layer (A) that comprises 40 to 99.9% by mass of a polyphenylene ether (a1), 0 to 59.9% by mass of a polystyrene (a2), and an amino group-containing polymer (a3) into contact with an adhesive layer (B) that comprises an acid-modified polyolefin.

11. A multilayer sheet comprising, a substrate layer (A) that comprises 40 to 99.9% by mass of a polyphenylene ether (a1), 0 to 59.9% by mass of a polystyrene (a2), and an amino group-containing polymer (a3); and an adhesive layer (B) that comprises an acid-modified polyolefin, wherein the substrate layer (A) has a storage modulus at 160° C. of 500 MPA or more.

12. The multilayer sheet according to claim 11, wherein a content of the amino group-containing polymer (a3) in the substrate layer (A) is from 2 to 40% by mass.

13. The multilayer sheet according to claim 11, wherein the substrate layer (A) has a softening point of 175° C. or higher.

14. The multilayer sheet according to claim 11, wherein the amino group-containing polymer (a3) in the substrate layer (A) comprises a polystyrene chain having an amino group at a terminal thereof.

15. The multilayer sheet according to claim 14, wherein the amino group-containing polymer (a3) in the substrate layer (A) is a styrene-diene-styrene block copolymer.

16. The multilayer sheet according to claim 11, wherein the acid-modified polyolefin is a maleic anhydride-modified polyolefin.

17. The multilayer sheet according to claim 11, wherein the substrate layer (A) has a thickness of from 50 to 300 μm and the adhesive layer (B) has a thickness of from 10 to 100 μm.

* * * * *